United States Patent [19]

Lustig et al.

[11] 4,348,437

[45] Sep. 7, 1982

[54] PUNCTURE-RESISTANT HEAT SHRINKABLE MULTILAYER PACKAGING FILM

[75] Inventors: Stanley Lustig, Park Forest; Stephen J. Vicik, Darien, both of Ill.

[73] Assignee: Union Carbide Corporation, Danbury, Conn.

[21] Appl. No.: 272,259

[22] Filed: Jun. 10, 1981

[51] Int. Cl.³ .................... B32B 27/40; C08G 18/42
[52] U.S. Cl. .................................. 428/35; 138/118; 138/118.1; 426/105; 426/127; 428/36; 428/220; 428/332; 428/336; 428/337; 428/423.1; 428/424.2; 428/424.4; 428/424.6; 428/518; 428/520; 428/522; 428/910; 428/423.3
[58] Field of Search ................. 428/423.3, 910, 424.6, 428/35, 36, 522, 520, 518, 423.1, 332, 337, 336, 220, 424.4, 424.2; 426/105, 127; 138/118, 118.1

[56] References Cited

U.S. PATENT DOCUMENTS

| | | | |
|---|---|---|---|
| 3,555,604 | 1/1971 | Pahlke | 18/14 |
| 3,591,561 | 7/1971 | Kazama | 528/76 |
| 3,741,253 | 6/1973 | Brax et al. | 138/137 |
| 3,912,843 | 10/1975 | Brazier | 428/910 |
| 3,956,544 | 5/1976 | Harrington | 428/910 |
| 3,982,986 | 9/1976 | Stone | 428/424.6 |
| 4,123,589 | 10/1978 | Korlatzki et al. | 428/425 |
| 4,178,401 | 12/1979 | Weinberg | 428/35 |
| 4,196,240 | 4/1980 | Lustig et al. | 428/35 |
| 4,296,156 | 10/1981 | Lustig | 428/35 |

FOREIGN PATENT DOCUMENTS 982923  2/1976  Canada ............................ 154/140

OTHER PUBLICATIONS

Ency. of Polymer Science & Technology, vol. 5, Interscience Publ., John Wiley & Sons, 1966 pp. 439–441.
Polymer Blends, ed. Dr. Paul and Seymour Newman, vol. 2, Academic Press, 1978, pp. 302–303.
Plastics Compounding, "Survey of Miscible Polymer Systems," Part II, O. Olabisi et al., Mar./Apr. 1980, pp. 51–60.

Primary Examiner—Ellis P. Robinson
Attorney, Agent, or Firm—Real J. Grandmaison; John C. LeFever; Harrie M. Humphreys

[57] ABSTRACT

A flexible biaxially stretched multilayer film including a layer having a thickness of at least about 0.5 mil and comprising a blend of a polyurethane polymer and an ethylene vinyl acetate copolymer, wherein the weight fraction of ethylene vinyl acetate copolymer in the blend does not exceed 0.40, the film having been subjected to a biaxial stretching in the range of from about 12 to about 20.

14 Claims, No Drawings

PUNCTURE-RESISTANT HEAT SHRINKABLE MULTILAYER PACKAGING FILM

BACKGROUND OF THE INVENTION

1. Field of the Invention

This invention relates to a flexible puncture-resistant heat shrinkable multilayer packaging film having particular utility for forming primal meat bags which are highly puncture-resistant in character.

2. Description of the Prior Art

In the art of packaging primal red meat cuts for shipment and/or storage prior to final butchering, it has been common practice to use heat-shrinkable multilayer film bags for packaging of the primal cuts. The multilayer films commonly employed for such purpose typically include a layer serving as an oxygen barrier to inhibit spoilage and discoloration of the meat by oxidation, with other layers in the film being employed to provide adequate strength, abrasion resistance, and good low temperature characteristics for the composite film material. The properties desirably possessed by such film materials include high puncture resistance, satisfactory heat-shrink characteristics, and high resistance to delamination at elevated temperatures and during the heat shrinking operation.

Canadian Pat. No. 982,923, issued Feb. 3, 1966 to Stanley Lustig et al. discloses a heat-shrinkable three-layer film having utility for forming bags suitable for use in shrink packaging primal meat cuts. The disclosed film comprises a first outer layer which consists essentially of a first ethylene/vinyl acetate copolymer having a melt index of from 0.1 to 1.0 decigrams per minute, and a vinyl acetate content of from 10 to 14 weight percent, based on the weight of the first ethylene/vinyl acetate copolymer. The core layer consists essentially of a vinylidene chloride copolymer having at least 65 weight percent of polymerized vinylidene chloride and containing a maximum of 5 weight percent plasticizer, the percentage being based on the weight of the vinylidene chloride polymer. A second outer layer of the film comprises a second ethylene/vinyl acetate copolymer having a melt index of from 0.1 to 1.0 decigrams per minute and a vinyl acetate content of from 12 to 18 weight percent, the percentage being based on the second ethylene/vinyl acetate copolymer.

The aforementioned film may suitably be produced by coextruding the three constituent layers through a tubular die, and then cooling and subsequently biaxially orienting the extrudate to obtain a heat shrinkable film suitable for forming the primal red meat bag. The extrusion and orientation process described in U.S. Pat. No. 3,555,604 issued January, 1971 in the name of H. E. Pahlke may suitably be employed to produce such heat shrinkable film.

The oriented three-layer film, as extruded in tubular form, is formed into bags by flattening the extruded tube, cutting the flattened tubes into desired lengths and heat sealing the sealable layers at one end while leaving the other end open for insertion of primal cuts of fresh red meat. The heat-sealable layers will then form the inner surface of the bag. After the meat is placed in the bag by the meat packer or other processor, the bag is evacuated and the open end thereof sealed in a conventional manner by clipping. The bag is then heat shrunk by exposure to elevated temperature, as for example by passage of the bag through a hot water spray, at a temperature which may suitably be on the order of 90°–95° C.

The primal cut red meat bag described above has demonstrated utility in commercial practice, but suffers from the deficiency that primal cuts of meat containing cut bones sometimes puncture the bag at bone corners or edges. This puncturing occurs even though such bone surfaces are covered with one or more layers of heavy wax impregnated cloth or paper (bone wrap) prior to packaging of the primal cut in the meat bag. Such puncturing of the meat bag by sharp bone surfaces permits the penetration of air from the ambient environment into the previously evacuated bag. This penetration of air causes localized meat spoilage in the vicinity of the bag puncture, thereby requiring additional labor for trimming of the meat prior to its final sale, as well as entailing significant meat losses.

The aforementioned puncturing of the meat bag is due primarily to puncture impact of the bag at bone corners during handling and shipping. Such impact is in turn the result of the bags being dropped or rubbed against hard surfaces such as other meat-containing bags or the interior surfaces of the boxes which are employed for shipment of the packaged meat.

In view of the foregoing, there is a need for packaging films with improved puncture toughness to resist bone puncture. In an attempt to remedy the bone puncture problem, it has been proposed to incorporate polyurethane elastomers in the multilayer film utilized in the primal cut red meat bags, in view of the high impact strength of such elastomeric materials. Generally, such films provide very high impact strength. However, the superior performance of certain grades of thermoplastic polyurethane has been shown to gradually deteriorate with time until most of the initial impact improvement is lost. It is theorized that this phenomena is related to stress-induced crystallinity which adversely affects impact strength. Selection of the polyurethane elastomer is very critical. Polyurethanes which have high impact values as single layer films may not provide the expected improvement in a coextruded film structure. Other polyurethanes which are not suitable by themselves can be improved by the addition of a specially selected elastomer.

Accordingly, it is an object of this invention to provide a multilayer film containing a polyurethane elastomer blend layer, characterized by high impact strength which is retained at desired levels despite the passage of time.

Other objects and advantages of this invention will be apparent from the ensuing disclosure and appended claims.

SUMMARY OF THE INVENTION

This invention relates to a flexible puncture-resistant, heat shrinkable and biaxially stretched multilayer film suitable for packaging primal red meat cuts, including a layer having a thickness of at least about 0.5 mil and comprising a blend of a polyurethane polymer and an ethylene vinyl acetate copolymer, wherein the weight fraction of ethylene vinyl acetate copolymer in the blend does not exceed 0.40, the film having been subjected to a biaxial stretching in the range of from about 12 to 20.

In practice, the multilayer film of the invention may comprise a first layer of a heat sealable polymer, such as an ethylene vinyl acetate copolymer, a second layer contiguous to the first layer serving as an oxygen barrier, which may, for example, consist of a polyvinylidene chloride copolymer or an ethylene vinyl alcohol copolymer and a third layer contiguous to the second layer as described in the preceding paragraph, comprising a blend of a polyurethane polymer and an ethylene vinyl acetate copolymer. Such a multilayer film may also comprise other layers as desired or necessary for printing or other purposes, e.g., a fourth layer of ethylene vinyl acetate copolymer which is contiguous to the third layer. The fourth layer could also comprise blends of polypropylene copolymers with other polyolefins.

Preferably, the three layer film discussed above has the following layers:

The first layer is an ethylene vinyl acetate copolymer having a vinyl acetate content of from about 5% to about 18% by weight (based on the weight of the ethylene vinyl acetate) and having a melt flow index of from about 0.2 to about 0.5 decigram per minute.

The second layer comprises a polyvinylidene chloride copolymer having from about 70% to about 90% by weight of polymerized vinylidene chloride, the remainder being vinyl chloride polymers. The second layer may further include conventional additives such as plasticizers, lubricants and stabilizers. Typically, the plasticizer may be a conventional plasticizer such as dibutyl sebacate and epoxidized soybean oil.

The third layer comprises a blend of a polyurethane polymer and an ethylene vinyl acetate copolymer, as discussed hereinabove.

The overall thickness of the three-layer film above described is preferably from about 2.0 mils to about 3.0 mils and most preferably about 2.75 mils. Films of less than about 2.0 mils thickness have relatively poor puncture resistance whereas films of greater than about 3.0 mils become difficult to clip close.

The term "biaxial stretching" as used herein is the product between the draw ratio in the machine direction (MD) and the stretch ratio (blow ratio) in the transverse direction (TD), and is conveniently approximated by the ratio of the stretched to the unstretched area of the film, or constituent layer thereof. For tubular "double bubble" extrusion, the TD stretch ratio (blow ratio) is the flat width of the final film exiting the stretching process divided by the flat width of the primary tube or "stem" entering the process. The MD draw ratio is the speed of the faster biorientation exit nip roller divided by the speed of the slower entering nip roller. In this invention, the film or a constituent layer is subjected to a biaxial stretching in the range from about 12 to about 20.

BRIEF DESCRIPTION OF THE PREFERRED EMBODIMENT

The present invention is based on the surprising and unexpected discovery that mixtures of high molecular weight thermoplastic polyester polyurethanes, preferably having a melt flow of 2 to 8 decigrams per minute as measured at 190° C. and a Shore A hardness of approximately 75 to 90 (as measured in accordance with the method set forth in ASTM D-2240), blended with ethylene vinyl acetate copolymer with the ethylene vinyl acetate copolymer constituting a weight fraction in the blend not in excess of 0.40, provides a compatible mixture evidenced by superior optical properties and provides a tough, puncture-resistant film which when biaxially stretched in the range of from about 12 to about 20, is characterized by a very high initial impact strength which undergoes no significant diminution with the passage of time.

Illustrative non-limiting examples of the practice of the invention are set out below. The parts, fractions and percentages set forth herein refer to parts by weight, weight fractions, and percentages by weight, respectively, unless specifically stated otherwise.

In the following examples, the sample multilayer films were formed by co-extrusion of the film layers through a tubular die, with the film being biaxially oriented by biaxial stretching in accordance with the conventional "double bubble" film-forming process. Such process is described for example in U.S. Pat. No. 3,555,604 issued January, 1971 in the name of H. E. Pahlke.

Samples 1-9 included a first outer layer of an ethylene vinyl acetate copolymer having a vinyl acetate content of about 12% by weight and a melt flow index of 0.3 decigrams per minute. All of these samples included a second layer (next to the first outer layer) of a polyvinylidene chloride copolymer having a vinylidene chloride content of about 83% by weight and a vinyl chloride content of about 17% by weight. The four layer samples 3-9 employed a polyurethane layer selected from the polyurethane polymers shown in Table I and having a composition set forth in Table II below. Samples 3-9 also contained another layer of an ethylene vinyl acetate copolymer having a vinyl acetate content of about 15% by weight and a melt flow index of about 0.5 decigrams per minute. Samples 1 and 2 were three layer films that did not include polyurethane. Samples 1 and 2 included another outer layer of an ethylene vinyl acetate copolymer having a vinyl acetate content of about 15% by weight and a melt flow index of about 0.5 decigrams per minute.

TABLE I

| Polyurethane Polymer | Melt Flow at (190° F.) | Shore "A" Hardness |
|---|---|---|
| PU A | 0.5 to 2.0 | 90 |
| PU B | 2 to 5 | 78 |

TABLE II

| | Polyurethane Layer | | | | |
|---|---|---|---|---|---|
| Sample | Polyester Polyurethane, wt. % | Ethylene Vinyl Acetate Copolymer wt. % | wt. % VA in EVA | EVA melt index* | Total Film Thickness, Mils |
| 1 | 0 | 0 | — | — | 2.4 |
| 2 | 0 | 0 | — | — | 2.75 |
| 3 | 100 (PU A) | 0 | — | — | 2.75 |
| 4 | 100 (PU B) | 0 | — | — | 2.75 |
| 5 | 80 (PU B) | 20 | 33 | 43 | 2.75 |
| 6 | 80 (PU B) | 20 | 28 | 25 | 2.75 |
| 7 | 80 (PU B) | 20 | 28 | 6 | 2.75 |
| 8 | 80 (PU B) | 20 | 18 | 2.5 | 2.75 |
| 9 | 50 (PU B) | 50 | 18 | 2.5 | 2.75 |

*Melt flow index at 190° C., decigrams per minute

It will be noted from Table II that the tested range of vinyl acetate in ethylene vinyl acetate copolymer is 18-33%, and this is a preferred embodiment of the invention. However, a range of 12-50% VA in EVA is probably operable. If still lower values below 12% VA are used, the polymer may lose desired elasticity and stretching ability. On the other hand, if higher values above 50% VA are used, the impact strength in the film is probably undesirably diminished.

The primary thrust of the instant invention is the provision of a heat-shrinkable multilayer packaging film exhibiting a high resistance to punctures which may result from packaging primal red meat cuts containing sharp bones. In order to assess the puncture resistance of the films formed in accordance with the present invention relative to conventional multilayer packaging films not employing the polyurethane/EVA copolymer layer of the invention, the test described below was carried out in order to simulate conditions corresponding to the handling and shipping of primal meat bags, under which sharp bones can puncture the primal meat bag.

The test procedure was a dynamic puncture test which was determined to correlate very well with typical conventional tests such as the "drop test". The dynamic puncture test uses a Dynamic Ball Burst Tester, Model 13-8, manufactured by Testing Machines Inc., Amityville, Long Island, N.Y. A special tip designed to simulate a sharp boned surface was built to replace the spherical-shaped impact head which forms a part of the original equipment. The modified testing device measured energy in units of kilogram-centimeters (kg-cm).

EXAMPLE 1

The above-described dynamic puncture test was conducted on samples having the compositions identified in Table II, with impact strength being measured at 30° F. Further, impact strength was subsequently measured sixty (60) days after the initial measurement was made, for samples 1–4 and 5. Finally, percentage haze was measured for samples 4 and 5–9, in order to determine compatibility characteristics of the polyurethane and ethylene vinyl acetate (EVA) copolymer components in the polyurethane/EVA copolymer layer of the film. The results are set forth in Table III.

TABLE III

| Sample | Initial Impact Strength @ 30° F., kg-cm | Impact Strength After 60 days, @ 30° F., kg-cm | % Haze |
| --- | --- | --- | --- |
| 1 | 4.0 | 4.0 | 4 |
| 2 | 5.0 | 5.0 | 5 |
| 3 | 5.7 | 5.0 | — |
| 4 | 4.9 | 4.9 | 4 |
| 5 | 6.2 | 6.2 | 32 |
| 6 | 5.7 | — | 20 |
| 7 | 6.1 | 6.1 | 6 |
| 8 | 6.0 | — | 7 |
| 9 | 5.2 | — | 9 |

Based on the packaging performance of the conventional film of samples 1 and 2 it was determined that the desired improvement in film toughness to provide satisfactory resistance to bone puncture necessitated an impact strength value of at least 5.5 kg-cm (as measured at 30° F.). As shown in Table III samples 3, 5, 6, 7 and 8 provided such impact strength levels (values of 5.7 6.2, 5.7 6.1, and 6.0, respectively). It should be noted that sample 3 had a satisfactory impact value initially but that it deteriorated with time, from 5.7 kg-cm initial impact down to 5.0 kg-cm impact strength after 60 days. Table III also shows that sample 4 which comprises 100% of a polyurethane polymer has a low impact strength of 4.9 kg-cm and that sample 7 which comprises a blend of 80% of the same polyurethane polymer and 20% of an EVA copolymer has an impact strength of 6.1 kg-cm which is about 25% higher than that of sample 4. Sample 7 did not show any measurable deterioration in impact strength after 60 days. Samples 5, 6, 7 and 8 show that selection of the right EVA copolymer for blending is extremely important to obtain low haze values.

As indicated earlier herein, the weight fraction of ethylene vinyl acetate copolymer in the layer comprising a blend of a polyurethane polymer and an ethylene vinyl acetate copolymer, in accordance with the invention should not exceed 0.40. The reason for such limit is that at weight fraction values in excess of 0.40, the impact resistance properties of the film tend to deteriorate. This is shown by comparison, for example, of the initial impact strength values measured for sample 8, containing an EVA copolymer weight fraction of 0.20 (impact strength of 6.0 kg-cm) with sample 9 which contains an EVA weight fraction 0.50 (impact strength of 5.2 kg-cm).

As indicated, the film of this invention is biaxially stretched in the range of from about 12 to about 20, preferably about 16. Biaxial stretching to about 16 represents a balance of these opposing considerations. Lower values than 12 result in non-uniform film thickness, while higher values than 20 tend to result in unsuitably low impact strengths (see Table IV). By contrast it is conventional practice for polyurethane films to be subjected to biaxial stretching at greater than 20.

EXAMPLE 2

In this evaluation, a series of samples, numbered as samples 10–13 in Table IV below, each having the composition previously identified with sample 7 in Table II, were impact tested by the dynamic puncture test described hereinabove, to assess the effect of annealing and biaxial stretching on the strength characteristics. A comparison of samples 10 and 11 shows that the annealed sample, which was annealed subsequent to extrusion and biaxial stretching, possessed a significantly higher impact strength than the unannealed sample 10. Samples 12 and 13 show the effect of biaxial stretching on the strength characteristics of the film samples. Sample 13, characterized by a biaxial stretching value of 19.4, had an impact strength value of 5.7 kg-cm, whereas sample 12, formed with a biaxial stretching value of 12.9, had a value of 7.3 kg-cm, which was 28% higher than the sample having the higher biaxial stretching. It should also be noted that Sample 13 with a biaxial stretching of 19.4 has an impact strength of 5.7 kg-cm which is only slightly above the lowest acceptable value of 5.5. Biaxial stretching above 20 would tend to produce impact strengths below 5.5 kg-cm, and this data supports the upper limit of 20.

TABLE IV

| Sample | Annealed | Blow Ratio | Draw Ratio | Biaxial Stretching | Impact Strength @ 30° F., kg-cm |
| --- | --- | --- | --- | --- | --- |
| 10 | No | 4.3:1 | 4.1 | 17.6 | 6.1 |
| 11 | Yes | 4.3:1 | 4.1 | 17.6 | 6.5 |
| 12 | No | 3.8:1 | 3.4 | 12.9 | 7.3 |
| 13 | No | 4.3:1 | 4.5 | 19.4 | 5.7 |

Although preferred embodiments of this invention have been described in detail it is contemplated that modification thereof may be made and some preferred features may be employed without others, within the spirit and scope of the broad invention.

What is claimed is:

1. A flexible puncture-resistant, heat shrinkable and biaxially stretched multilayer film suitable for packaging primal red meat cuts, including a layer having a thickness of at least about 0.5 mil comprising a blend of polyurethane polymer and an ethylene vinyl acetate copolymer, wherein the weight fraction of ethylene vinyl acetate copolymer in said blend does not exceed 0.40, with said film having been subjected to a biaxial stretching in the range of from about 12 to about 20.

2. The multilayer film of claim 1, wherein the biaxial stretching is about 16.

3. The multilayer film of claim 1, wherein said polyurethane polymer is a thermoplastic polyester polyurethane having a melt flow of from about 2 to about 8 decigrams per minute, as measured at 190° C., and a Shore A hardness of from about 75 to about 90.

4. The multilayer film of claim 1, wherein said ethylene vinyl acetate copolymer comprises between about 12 and about 50% vinyl acetate by weight.

5. The multilayer film of claim 1, wherein said ethylene vinyl acetate copolymer comprises between about 18 and about 33% vinyl acetate by weight.

6. The multilayer film of claim 1, annealed subsequent to extrusion and biaxial stretching.

7. The multilayer film of claim 1, wherein said film has three layers comprising a first layer of a heat sealable polymer; a second layer contiguous to said first layer and providing a barrier to oxygen permeation through the film and a third layer contiguous to said second layer and comprising a blend of a polyurethane polymer and an ethylene vinyl acetate copolymer.

8. A primal meat bag formed from the three layer film of claim 1.

9. The three layer film of claim 1, wherein said first layer is composed of ethylene vinyl acetate copolymer.

10. The three layer film of claim 1, wherein said second layer is composed of polyvinylidene chloride copolymer.

11. The three layer film of claim 1, wherein a fourth layer of ethylene vinyl acetate is contiguous to said third layer.

12. The multilayer film of claim 1, wherein said ethylene vinyl acetate copolymer has a vinyl acetate content of from about 18 to about 28% by weight.

13. A primal meat bag formed from the film of claim 1.

14. The multilayer film of claim 11 wherein the overall thickness of said four-layer film is from about 2.0 mils to about 3.0 mils.

* * * * *

UNITED STATES PATENT AND TRADEMARK OFFICE
CERTIFICATE OF CORRECTION

PATENT NO. : 4,348,437
DATED : September 7, 1982
INVENTOR(S) : Stanley Lustig and Stephen J. Vicik It is certified that error appears in the above—identified patent and that said Letters Patent is hereby corrected as shown below:

Column 8, line 9, for "claim 1" read -- claim 7--.

Column 8, line 10, for "claim 1" read --claim 7--.

Column 8, line 12, for "claim 1" read --claim 7--.

Column 8, line 15, for "claim 1" read --claim 7--.

Column 8, lines 21-22, for "claim 1" read --claim 11--.

Signed and Sealed this

Tenth Day of May 1983

[SEAL]

Attest:

GERALD J. MOSSINGHOFF

Attesting Officer

Commissioner of Patents and Trademarks